Patented Nov. 19, 1929

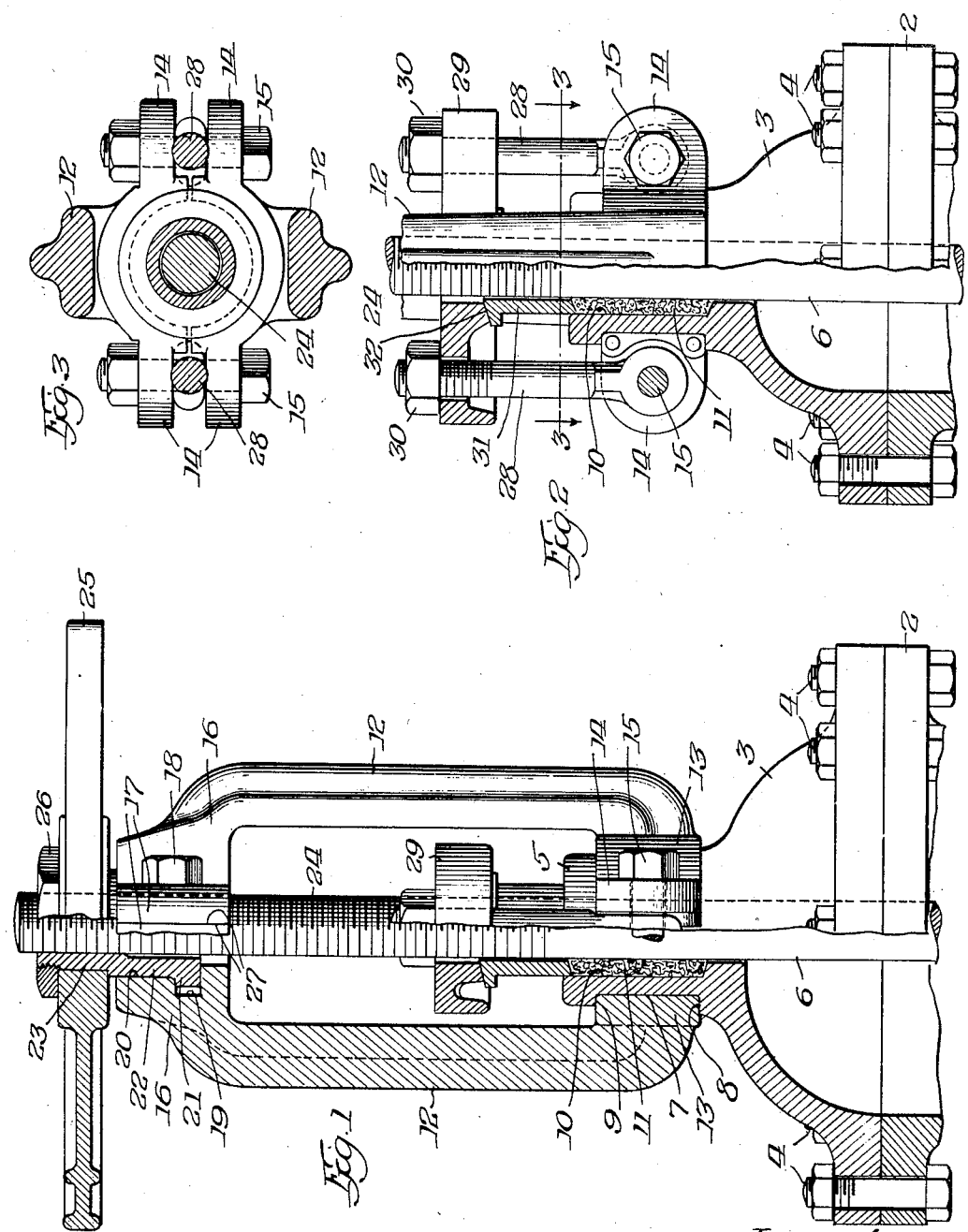

1,736,405

UNITED STATES PATENT OFFICE

ARTHUR M. HOUSER, OF OAK PARK, AND CARL A. DOPP, OF CHICAGO, ILLINOIS, ASSIGNORS TO CRANE CO., OF CHICAGO, ILLINOIS, A CORPORATION OF ILLINOIS

VALVE-YOKE CONSTRUCTION

Application filed February 4, 1928. Serial No. 251,792.

This invention relates to valves and more particularly to a valve yoke construction including a novel arrangement of stuffing box gland sleeve or nut securing means.

Heretofore most valves employing yokes have had the yoke cast or otherwise formed integral with the bonnets and in most instances it has been impractical if not impossible to manufacture the yokes with integral bonnets or the yokes with a connecting part for connection to a bonnet except by casting or the like. When the yoke is cast with or without the bonnet it involves difficult and expensive machining operations for the reception of the valve stem and stem bushings etc. Consequently it has been desired to make the yoke arms by forging but again it has been found impractical commercially to forge the arms integral with the bonnet. As will be obvious, however, we have devised a constructional arrangement of yoke arms and bonnet whereby the yoke arms may be forged or otherwise made independently of one another end of the bonnet in a simple, efficient and economical manner and a construction in which the defects of prior constructions are eliminated or obviated and in which novel advantages are provided.

Accordingly it is a primary object of our invention to provide a split yoke for a valve adapted to be used in connection with a bonnet made by casting or forging or one otherwise manufactured.

Another and perhaps equally important object is to provide a valve yoke construction which may be cheaply and readily manufactured, assembled and dismantled and one so arranged in connection with a suitable bonnet that it may be adjusted about the axis of the bonnet to any diametric position with respect thereto.

A further object is to provide a valve yoke construction facilitating the insertion and removal of the yoke sleeve or bushing through which the valve stem projects and with which the stem is threadedly engaged.

A still further object is to provide a yoke construction of the character described in which the bolts or other means connecting or spacing the yoke arms may be used for a double purpose, that of holding or spacing the yoke arms apart and that of providing an anchor for the gland studs which hold the packing gland sleeve or bushing in position.

Many further objects including the details of construction and the arrangement of the parts as well as the advantages and uses of our invention will be or should become readily appreciated after perusal of the following specification and claims, and after viewing the drawing in whch:

Fig. 1 is a fragmentary elevational view, partly in section, of a valve, valve body and yoke construction illustrating one embodiment of our invention.

Fig. 2 is an elevational view similar to that of Fig. 1 but taken at right angles thereto with the upper portion of the yoke arms broken away, and Fig. 3 is a transverse section taken on the line 3—3 of Fig. 2.

A valve body 2 is shown as provided with a bonnet 3 secured to it by any desirable number of bolts 4. The bonnet 3 is provided with an upstanding, hollow, cylindrical boss 5 through which the valve stem 6 projects and the boss has a circumferential generally cylindrical recess formed in its external surface to provide a substantially cylindrical abutment surface 7 providing innumerable contact areas between shoulders 8 and 9 and internally is counterbored as shown at 10 to provide a packing recess within which packing 11 of any suitable character may be disposed. If desired, the abutment surface 7 may, instead of being cylindrical, be a series of facets against which correspondingly faced ends of the yoke arms may be abutted as will appear hereinafter.

The yoke arms themselves designated 12 are in the embodiment shown identical with one another although complementary. These arms are individually forged, or otherwise suitably manufactured, that is, they are made separate from one another and during their manufacture are provided with bottom end portions 13 adapted to be received in the recess of the boss 5 and to conform at their inwardly directed faces to the surfaces against which they abut. Projecting laterally from each side of the bottom end 13 of each arm is a lug or ear 14 through which holes are drilled for the reception of bolts 15 which connect the bottom ends of the arms together on opposite sides of the boss 5. When the bolts 15 are tightened with the arms engaged on opposite sides of the boss 5, the arm ends 13 are drawn tightly against the surface or surfaces 7 and are held between the shoulders 8 and 9 so that up or down or lateral thrusts will not displace the arms from their positions.

The top ends 16 of the arms are forged or otherwise formed to provide lugs or ears 17 through which holes are drilled for the reception of clamping bolts 18 and are either forged or machined on their inner surfaces to provide semi-circular recesses (one shown) 19 and arcuate faces 20 for the reception of a circular shoulder portion 21 and a cylindrical barrel portion 22 respectively, of a stem engaging bushing or yoke sleeve 23 which is internally threaded to engage threads 24 of the stem 6 and upon which a hand wheel or other valve operating device 25 is splined or keyed and secured by a nut, or the like, 26. The bushing or sleeve 23 is rotatably mounted between the upper ends of the yoke arms 12 but may not move longitudinally thereof because of the circular shoulder or flange 21 which imparts the thrust imposed upon the sleeve, depending upon the direction in which the stem is being moved to open or close the valve, to the upper and lower surfaces of the recess 19. This thrust is in turn absorbed by the shoulders 8 and 9 of the bonnet and its boss 5 so that to all intents and purposes the yoke arms and bonnet may be treated as unitary, that is, integral with one another. In order that the upper ends of the yoke arms will not bind the sleeve or bushing 23 when they are drawn and clamped together by the bolts 18, one of which is on each side of the stem, the lugs or ears 17 are provided with nicely machined or forged or otherwise formed abutting surfaces 27 that determine the extent to which the upper ends of the arms may be drawn together.

From the following it will be appreciated that the arms 12 may be made in a very simple, efficient and effective manner, that they may be easily fitted and assembled together with a bonnet, bushing or sleeve and stem, that they may be as easily disassembled and replaced for any purposes whatsoever, that they may be adjusted about the bonnet top or boss 5 to any circumferential positions about the bonnet or valve as may be expedient or desirable, and that with all they are as strong and rigid, if not stronger and more rigid, when in position and secured together into the bonnet, than they would be if an integral of the bonnet. Forging, for example, of the bonnet as well as the yoke is very much simplified and the split yoke permits the yoke sleeve or stem bushing to be inserted or removed quickly and readily as well as to be lined up more easily. The advantages and uses of the construction so far described are of vast importance as should clearly be appreciated from the foregoing.

Ordinarily, lugs, ears or bosses are forged, cast or otherwise formed on the top of the bonnet into which studs are screwed or through which bolts are passed for connection to a stuffing box gland follower in order that the follower may be drawn down against the packing with or without a sleeve interposed therebetween for the purpose of compressing and securing packing about the stem within the stuffing box recess usually formed in the top of the bonnet. Obviously this adds to the weight of the valve in order to provide for the anchoring of the gland studs and/or bolts. This is objectionable when such additional weight adds nothing to the material valve strength. This form of construction has its advantages but also its disadvantages. Sometimes the studs become broken off or bent and are difficult to remove and then sometimes the threads are stripped, likewise rendering them difficult to remove. In neither case is it practical nor feasible to adjust the yoke arms about the top of the bonnet relatively to the packing gland securing studs or bosses and even though the yoke arms themselves were adjustable relatively to the bonnet, the lugs or bosses into which the studs or bolts for the packing gland follower pass would be in the way. Many other inconveniences resulting from prior constructions could be mentioned but with our arrangement all these difficulties encountered with and disadvantages of the prior art are overcome. To this end eye-bolts 28 are threaded on to the bolts 15 between co-operative pairs of ears or lugs 14 and may swing or pivot freely thereon. At their free ends, the eye-bolts 28 are threaded and passed through suitable apertures or holes formed in the gland flange 29 and the latter together with a gland or sleeve portion 31, which fits within the packing recess 10 and against the packing 11 in the usual manner, is drawn down by nuts 30 screwed on the bolts 28 against the gland flange.

Owing to spherically bevelled shoulders 32 between the gland flange 29 and the gland 31 these two members are always centered with respect to one another regardless of the position in which the yoke arms are disposed, hence the eye-bolts 28 may be moved about the bonnet to any position with respect thereto. The bolts 15 therefore serve a double purpose namely that of holding the yoke arms 12 together and to the bonnet, and that of holding the gland eye-bolts securely and in position. The parts may be easily adjusted and assembled and are peculiarly simple to construct, assemble, replace and repair.

We have illustrated and described what at present is a preferred form of our invention but it should be evident that the invention is of broader application and embodiment in other forms bearing little if any resemblance to that illustrated and described and the particular embodiment is susceptible of modification and variation, all without departing from the spirit of the invention and the scope of the appended claims.

We claim:

1. A valve yoke construction comprising in combination, a bonnet having a stem passage and a flange outwardly projecting from adjacent the top thereof on opposite sides of said passageway, a yoke arm having a portion engaged with one of said flanges and extending away from said bonnet, a second yoke arm having a portion similarly engaged with the opposite flange and extending similarly away from said bonnet, and means for simultaneously securing said arms together and said portions against said bonnet.

2. In a valve yoke construction in combination, a bonnet, complementary individual yoke arms adapted to be secured to said bonnet, and means for removably securing said arms at once together and to said bonnet.

3. In a valve yoke construction in combination, a bonnet, complementary individual yoke arms each adapted to abut at one end against a portion of the bonnet, and means releasably connecting said yoke arm ends for rotatably securing them against said portions of said bonnet.

4. In a valve yoke construction in combination, a bonnet, complementary individual yoke arms each adapted to abut at one end against a portion of the bonnet, and means releasably connecting said yoke arm ends for at once securing said yoke arm ends together and against said portions of said bonnet.

5. In a valve yoke construction in combination, a bonnet having abutment surfaces and a valve stem opening between said surfaces, complementary separable yoke arms, each arm having at one end a portion adapted to engage an abutment surface on said bonnet, and means for releasably securing said portions to said surfaces in predetermined relation to one another, said portions being adjustable to any radial position about the axial center of said opening.

6. In a valve yoke construction in combination, a bonnet having a hollow boss providing a stem passage therethrough, rising from its top surface, the external side surface of said boss providing a plurality of abutment contact areas, a flange projecting outwardly from said boss beyond each contact area above said top surface, a pair of complementary yoke arms adapted to be disposed opposite one another with one end of either abutting against any one of said contact areas, and means for securing said arm ends in position against said areas.

7. In a valve yoke construction in combination, a bonnet having a hollow boss providing a stem passage therethrough rising from its top surface, the external side surface of said boss providing a plurality of abutment contact areas, a flange projecting outwardly from said boss beyond each contact area above said top surface, a pair of complementary yoke arms adapted to be disposed opposite one another with one end of either abutting against any one of said contact areas, and means for securing either arm end against any one of said contact areas.

8. In a valve yoke construction in combination, a bonnet having a hollow boss adapted to receive a stem therethrough and providing a stuffing box recess, a flange projecting laterally from said boss adjacent the top thereof and providing a downwardly directed shoulder, a pair of complementary yoke arms each having a portion adapted to engage said shoulder on opposite sides of the boss, and means adapted to connect said yoke arms on opposite sides of said boss.

9. In a valve yoke construction in combination, a bonnet having a hollow boss adapted to receive a stem therethrough and providing a stuffing box recess, a flange projecting laterally from said boss adjacent the top thereof and providing a downwardly directed shoulder, a pair of complementary yoke arms each having a portion adapted to engage said shoulder on opposite sides of the boss, and means adapted to connect said yoke arms on opposite sides of said boss, said arms and connecting means being adjustable about said boss to a plurality of positions relative thereto.

10. In a valve yoke construction in combination, a bonnet having a hollow boss adapted to receive a stem therethrough and providing a stuffing box recess, a flange projecting laterally from said box adjacent the top thereof and providing a downwardly directed shoulder, a pair of complementary yoke arms each having a portion adapted to engage said shoulder on opposite sides of the boss, means adapted to connect said yoke arms on opposite sides of said boss, means for engaging packing in said recess, and means connected to said yoke arm connecting means for securing said packing engaging means against packing in said recess.

11. In a valve yoke construction in combination, a bonnet having a hollow boss adapted to receive a stem therethrough and providing a stuffing box recess, a flange projecting laterally from said box adjacent the top thereof and providing a downwardly directed shoulder, a pair of complementary yoke arms each having a portion adapted to engage said shoulder on opposite sides of the box, means adapted to connect said yoke arms on opposite sides of said boss, said arms and connecting means being adjustable about said boss to a plurality of positions relative thereto, means for engaging packing in said recess, and means connected to said yoke arm connecting means for securing said packing engaging means against packing in said recess.

12. In a valve yoke construction in combination, a bonnet having a hollow boss adapted to receive a stem therethrough and providing a stuffing box recess, a flange projecting laterally from said boss adjacent the top thereof and providing a downwardly directed shoulder, a pair of complementary yoke arms each having a portion adapted to engage said shoulder on opposite sides of the boss, means adapted to connect said yoke arms on opposite sides of said boss, and means connected to said yoke arm connecting means for compressing packing in said stuffing box recess.

13. In a valve yoke construction in combination, a bonnet having a passage therethrough for reception of a valve stem, a yoke arm abutment surface on said bonnet on each side of a diameter of said passage, a downwardly facing shoulder on said bonnet above each abutment surface, complementary yoke arms each at one end having a portion adapted to abut against one of said surfaces and a portion adapted to engage the shoulder thereabove, and means for releasably securing said arm portions of each arm against said surface and shoulder.

14. In a valve yoke construction in combination, a bonnet having a passage therethrough for reception of a valve stem, a yoke arm abutment surface on said bonnet on each side of a diameter of said passage, a downwardly facing shoulder on said bonnet above each abutment surface, complementary yoke arms each at one end having a portion adapted to abut against one of said surfaces and a portion adapted to engage the shoulder thereabove, means for releasably securing said arm portions of each arm against said surface and shoulder and means connected to the opposite end of each arm for rotatably securing a yoke sleeve therein.

15. In a valve yoke construction in combination, a bonnet having a passage therethrough for reception of a valve stem, a yoke arm abutment surface on said bonnet on each side of a diameter of said passage, a downwardly facing shoulder on said bonnet above each abutment surface, complementary yoke arms each at one end having a portion adapted to abut against one of said surfaces and a portion adapted to engage the shoulder thereabove, means for releasably securing said arm portions of each arm against said surface and shoulder and complementary means on the opposite end of each arm for holding a yoke sleeve rotatably but longitudinally immovable therebetween.

In witness of the foregoing we affix our signatures.

A. M. HOUSER.
CARL A. DOPP.